Patented Feb. 20, 1923.

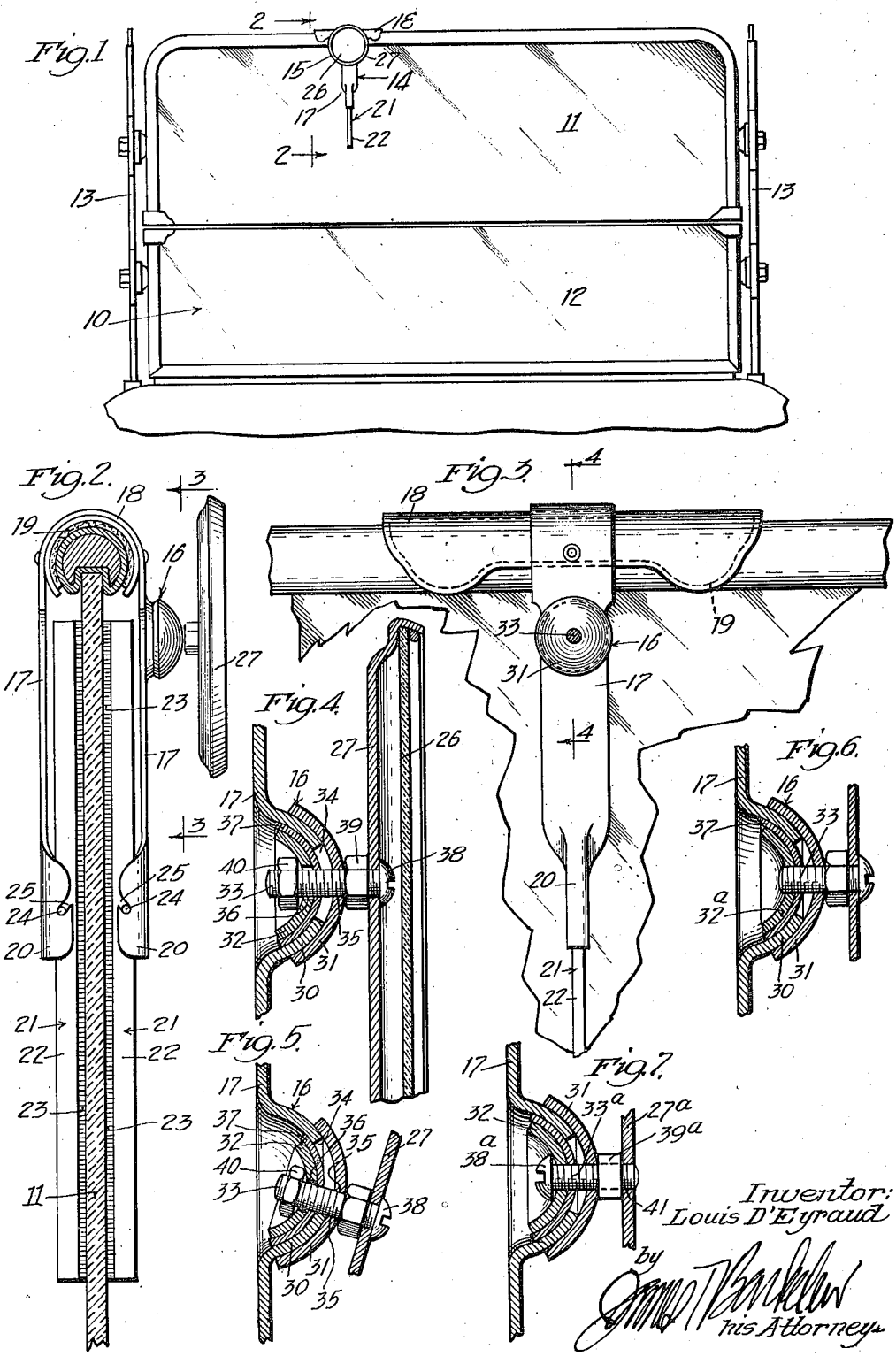

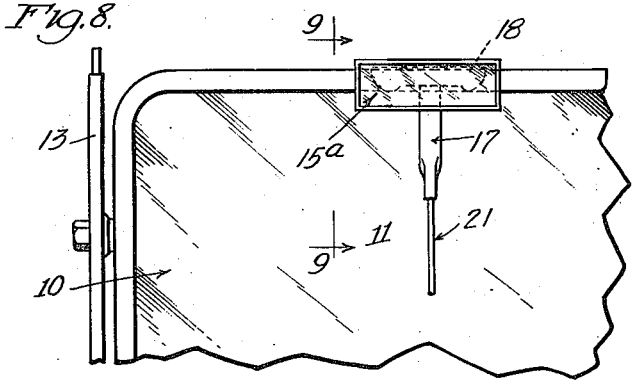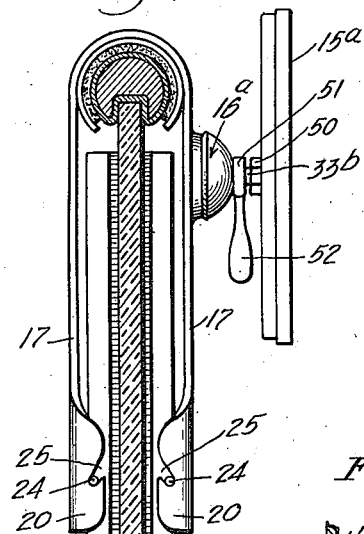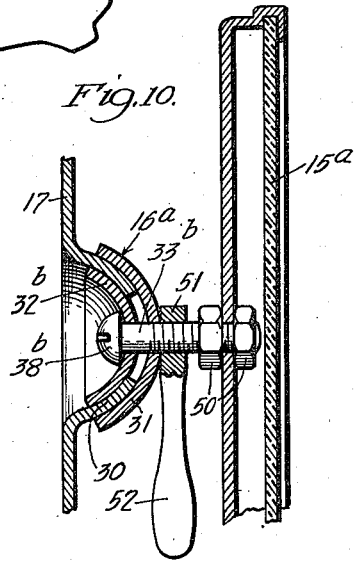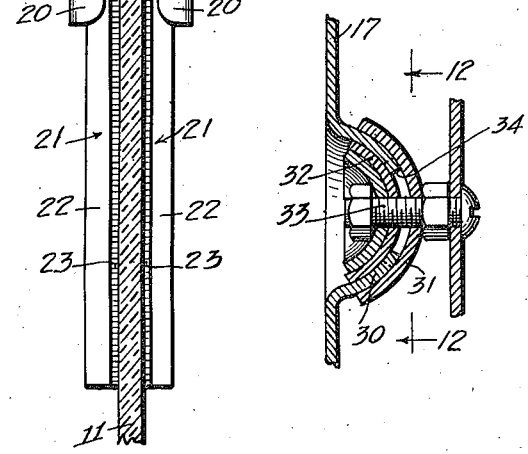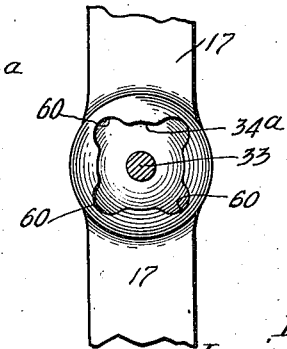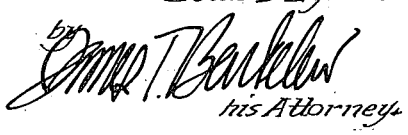

1,446,164

UNITED STATES PATENT OFFICE.

LOUIS D'EYRAUD, OF LOS ANGELES, CALIFORNIA.

UNIVERSAL MOUNTING DEVICE.

Application filed April 1, 1920. Serial No. 370,548.

*To all whom it may concern:*

Be it known that I, LOUIS D'EYRAUD, a citizen of the United States, residing at Los Angeles, in the county of Los Angeles, State of California, have invented new and useful Improvements in Universal Mounting Devices, of which the following is a specification.

This invention relates to universal mounting devices and it is an object of the invention to provide a simple, effective, and compact device of this character.

A primary object of the invention is to provide an extremely simple yet effective device by which members or structures, of various kinds, may be carried so as to be adjustable or movable in any desired direction, or to any desired position, and easily and quickly set or locked. The device is applicable for use in mounting numerous devices and members which require universal mounting and which must be easily and quickly adjustable. In the following specification I set forth the device in a number of preferred forms and as applied to mounting mirrors. It will be understood, however, that the illustration of the device in connection with mirrors does not limit or restrict its scope to such application as it may be advantageously used in numerous other connections.

A particular and noteworthy feature of the device provided by the invention is its simplicity of construction and operation. The device may be very easily and inexpensively manufactured as it requires no complicated or expensive parts and can be easily and quickly assembled. The operations of the device required, to release, or loosen, and to set, or tighten it, are extremely simple and may be very quickly and easily executed. In fact, the device permits of the member, being carried by it, being arranged as the control or operating member. To loosen the device and allow it to be moved, it is merely necessary to turn the control member a fraction of a revolution in the proper direction; and to tighten the device it is merely necessary to turn the control member back.

A further feature of the invention is the compact, sightly construction of the device. The device is extremely sightly in appearance at the same time being strong and effective.

There are further objects and features of the invention which will be best understood from the following detailed description of preferred embodiments of the invention throughout which reference is had to the accompanying drawings, in which—

Fig. 1 is a face view of a typical automobile windshield as viewed from the front seat of the automobile showing a windshield cleaner arranged on the windshield and a rear-sight mirror mounted on the windshield cleaner by the device provided by the invention; Fig. 2 is an enlarged sectional view taken as indicated by line 2—2 on Fig. 1; Fig. 3 is a sectional view taken as indicated by line 3—3 on Fig. 2; Fig. 4 is an enlarged detail sectional view taken as indicated by line 4—4 on Fig. 3 showing the mirror supported by the mounting device so as to be parallel with the windshield; Fig. 5 is a sectional view similar to Fig. 4 showing the mirror supported at an angle with the windshield; Fig. 6 shows a sectional view similar to Figs. 4 and 5, of a form of construction of the mounting device which differs somewhat from that form shown in Figs. 4 and 5; Fig. 7 is a sectional view similar to Figs. 4, 5 and 6 of still another form of construction; Fig. 8 is a face view of a portion of a windshield showing a windshield cleaner mounted on the windshield and a mirror, different in shape to the mirror shown in Figs. 1 and 2 of the drawings, mounted on the windshield cleaner; Fig. 9 is an enlarged sectional view taken as indicated by line 9—9 on Fig. 8; Fig. 10 is an enlarged detailed sectional view similar to Fig. 4 of the form of the invention shown in Figs. 8 and 9; Fig. 11 is a sectional view similar to Figs. 4, 6 and 7 of another form of the device; and Fig. 12 is a view taken as indicated by line 12—12 on Fig. 11 with the outer clamp member, or the cap, of the device removed.

Throughout the drawings numeral 10 designates the automobile windshield which comprises two panels, an upper panel 11 and a lower panel 12, mounted or supported between suitable standards 13. The windshield cleaner 14 on which the mirror 15 is carried or mounted by the mounting device 16, is slidably mounted on the upper panel 11 of the windshield 10 in the manner clearly illustrated in Figs. 1, 2 and 3 of the drawings. The particular windshield cleaner herein set forth comprises a U-shaped frame the two sides or arms of which are arranged on opposite sides of the panel 11. A suitable slider 18, lined with felt 19, is secured to the U-shaped frame so as to engage or be carried on the frame of the panel 11. At the ends of the arms 17 the edges or sides thereof are bent inwardly toward each other to form channel portions 20 between which are carried cleaners or wipers 21. The wipers 21 comprise metal frames 22 which carry rubber strips 23 and are secured or connected to the channel portions 20 of the arms 17 by pins 24 which extend from their sides and engage slots 25 in the sides of the channel portions 20, as clearly shown in Figs. 2 and 9 of the drawings. This particular construction permits of the U-shaped frame being easily placed over the edge of the windshield before the wipers 21 are put in place and also causes the wipers 21 to be effectively carried by the arms 17 so as to properly seat on or engage the two sides or surfaces of the panel 11. The combined windshield cleaner and rear-sight mirror such as is herein set forth is the subject of my co-pending application Serial No. 353,755 filed January 24th, 1920 entitled "Windshield attachment."

Referring particularly to Figs. 1, 2, 3, 4, and 5 of the drawings the mirror 15 is adjustably secured to, or mounted on, one of the arms 17 by the mounting device 16. The mirror 15 is preferably the usual type of rear-sight mirror comprising a silvered glass 26 carried in a suitable metal frame 27. The mounting device 16 comprises a cup or socket and two clamp members, one a cap 31 and the other a washer 32, all of which are arranged in connection with a bolt 33. The socket 30, the wall of which is spherically shaped or curved, is formed directly in the arm 17 for simplicity of construction. The cap 31, a member preferably formed from sheet metal, is cupped or curved, to fit over, or on the outside of, the socket 30, as clearly shown in Figs. 2, 3, 4 and 5. The washer 32 is also preferably formed from sheet metal to fit within the socket 30 in the manner clearly shown in Figs. 4 and 5. A comparatively large round aperture 34 is formed in the socket 30 to receive the bolt 33 which extends through bores 35 and 36 in the cap 31 and washer 32, respectively. It is preferred, although not necessary, that there be a friction washer 37 interposed between the inside of socket 30 and the washer 32 in the manner shown in the drawings. The bolt 33 is carried by the frame 27, of the mirror 15, being arranged so that its head 38 is within the frame 27, or between the frame and the glass 26. The bolt 33 is secured to the frame 27, or prevented from rotating relative to the frame, by a lock nut 39 arranged on the outside of the frame 27 and tightened on the bolt 33 so that the frame 27 is firmly clamped between it and the head 38. The bolt 33 is sufficiently long to project through the cap 31, socket 30, friction washer 37, washer 32 and have screw threaded on its end a nut 40. Due to the fact that the washer 32 is cupped or curved to conform with the socket 30, the nut 40 fits within the washer 32, as clearly shown in Figs. 4 and 5 of the drawings. The corners of the nut 40 engaging the washer 32 prevent it from rotating when the bolt 33 is rotated. It will be readily understood how the bolt 33 may be rotated, by rotating or turning of the mirror 15, so as to cause the washer 32 and cap 31 to firmly grip, or be clamped onto, the socket 30. When the washer 32 and cap 31 are thus clamped on the cup 30 the mirror 15 is firmly held against movement or displacement. In practice, the friction washer 37, which is preferably fibre, causes the device to be particularly effective even though the cap 31 and washer 32 are not very tightly clamped on the cup 30. This is an important feature in that it makes it unnecessary, in order to effectively tighten the device, to tighten the parts so that they are strained or injured.

Proper rotation of the mirror 15 will at any time loosen the washer 32 and cap 31 so that the mirror may be turned or adjusted to various angles or positions. The comparatively large aperture 34 in the cup 30 allows the bolt 33 to be moved a considerable amount in any direction thereby allowing the mirror to be adjusted to various positions. Due to the curvature of the cap 31, socket 30 and washer 32 being the same, or spherical, they all properly fit together or engage each other regardless of the position into which the mirror may be turned or moved. After having turned or adjusted the mirror to the desired position it may be effectively locked or set in that position by merely rotating it enough to cause the washer 32 and cap 31 to be clamped onto the socket 30. In practice, it has been found that, when the device is constructed substantially as shown in the drawings, it is necessary to rotate the mirror 15 only a fraction of a revolution in order to loosen or tighten the cap and washer. Further, it will be understood that the mirror 15 being circular affords, or presents, an effective handle or operator for the device. Also, the lock-nut 39 being arranged on the bolt 33 between the mirror frame 27 and cap 31 acts as a spacer to hold the mirror away from the arm 17 so that it will have a large range of adjustment without striking the arm. The socket and the two clamping members, namely the cap and the washer are preferably proportioned so that the aperture 34 in the socket is never uncovered even though the mirror is adjusted or moved to an extreme position such as is shown in Fig. 5.

In Fig. 6 of the drawings is shown a form of construction slightly different from that just described in that the bolt 33, instead of having a nut 40 screw threaded onto its outer end, screw threads into the washer 32$^a$. It will be readily understood how the bolt 33 may be rotated to cause the washer 32$^a$ and cap 31 to be moved toward each other and clamped on the socket 30 or to cause the washer 32$^a$ and cap 31 to be released or loosened from the socket 30. In this particular form of the invention the friction washer 37 not only acts as a member to hold the device in a set position when the washer 32$^a$ and cap 31 are clamped on the socket 30 but also hold the washer 32$^a$ against rotation when the bolt 33 is turned or rotated.

In Fig. 7 of the drawings is shown another form of construction in which the head 38$^a$ of the bolt is arranged within the washer 32 while the outer end of the bolt screw threads into a bore 41 in the mirror frame 27$^a$. With this form of construction the bolt 33$^a$ does not rotate but the mirror 15 either screws onto, or off of, the bolt when it is rotated. When this form of construction is employed the mirror 15 may be spaced from the arm 17 by a suitable sleeve 39$^a$ arranged on the bolt 33$^a$ between the cap 31 and the mirror frame 27$^a$, as clearly shown in the figure.

In Figs. 8, 9 and 10 of the drawings is shown a form of construction particularly adapted for mounting members or devices so that they do not form the actuating or operating member of the mounting device. For sake of illustration a rectangular mirror 15$^a$ is shown mounted on the arm 17 by the mounting device 16$^a$. In this form of construction the head 38$^b$ of the bolt 33$^b$ is arranged within the washer 32$^b$ while the mirror 15$^a$ is mounted or held on the outer portion of the bolt 33$^b$ between the two nuts 50. The nuts 50 are preferably tightened on the bolt 33$^b$ so as to firmly and securely hold the mirror 15$^a$ on the bolt 33$^b$ against displacement or rotation. It will be noted that in this form of construction the bolt is somewhat longer than in the forms of construction hereinabove described and that a locking nut 51 is screw threaded on the bolt 33$^b$ between the cap 31 and innermost nut 50. The nut 51 is provided with an extension or handle 52 by which it may be easily and conviently turned or rotated in order to clamp the cap 31 and washer 32$^b$ onto the socket 30 or release the cap 31 and washer 32$^b$ from the socket 30. To operate this form of device it is merely necessary for the operator to reach behing the mirror 15$^a$ and operate the nut 51 by the handle 52.

In Figs. 11 and 12 of the drawings, is shown a form of socket that may be advantageously employed or used in the mounting device when it is desired to mount a member or device having an exceptionally large range of adjustment. In this particular socket the aperture 34$^a$ is not round as in the forms of construction hereinabove set forth but is irregular in shape having a plurality of depressions 60 into which the bolt 33 may be moved in order to turn or adjust the mirror a greater amount than would be possible with a round aperture such as is shown in the other forms of construction. It will be understood that when the bolt 33 is moved into one of the depressions 60 the cap 31 and washer 32 engage a sufficient amount of the socket 30 to securely and effectively grip it when they are clamped or tightened.

Having set forth preferred form of my invention I do not wish to restrict myself to the particular details hereinabove set forth but wish to reserve to myself any variations that may appear to those skilled in the art or that may fall within the scope of the following claims.

Having described a preferred form of my invention, I claim:

1. A device adapted to mount a member on a base comprising, a socket, clamp members at opposite sides of the socket, and means adapted to releasably clamp the clamp members to the socket, said means being adapted to cooperate with the socket to allow the mounted member to be adjusted further in one direction than in another.

2. A device adapted to mount a member on a a base comprising, a socket, clamp members at opposite sides of the socket, and means adapted to releasably clamp the clamp members to the socket, said means being adapted to cooperate with the socket to allow the mounted member to be adjusted further in a plurality of predetermined directions than in other directions.

3. An adjustable mounting device comprising a socket having an opening with depressions, clamp members at opposite sides of the socket, and a member extending loosely through the opening and adapted to clamp the clamp members to the socket, said member being adapted to be moved into the depressions to allow more adjustability of the device in some directions than in others.

In witness that I claim the foregoing I have hereunto subscribed my name this 22d day of March 1920.

LOUIS D'EYRAUD.

Witness:
VIRGINIA BERINGER.